April 27, 1943.   H. P. PHILLIPS   2,317,637
PISTON RING
Filed March 11, 1940
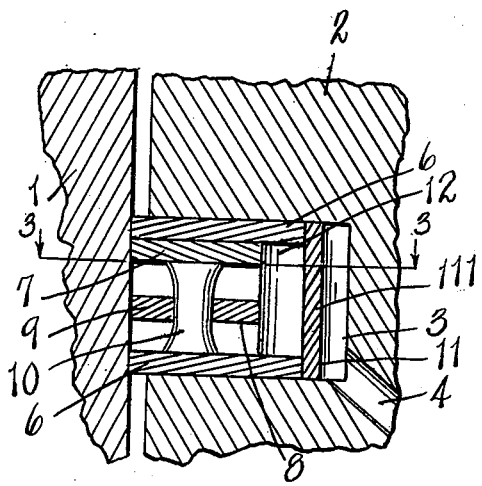
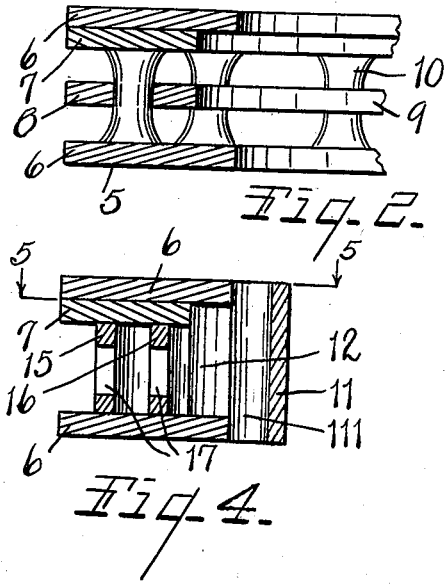
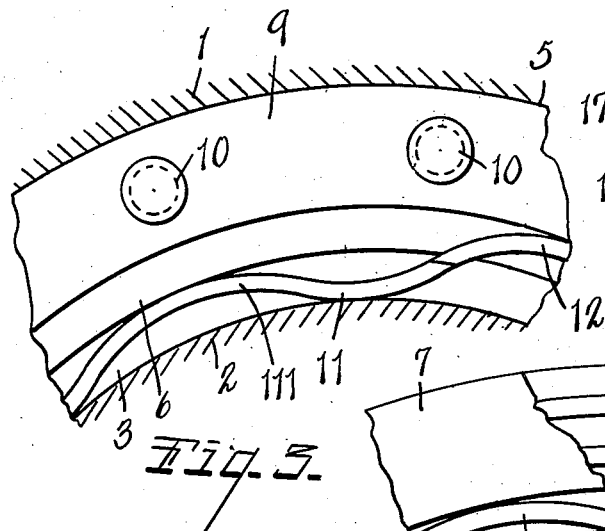
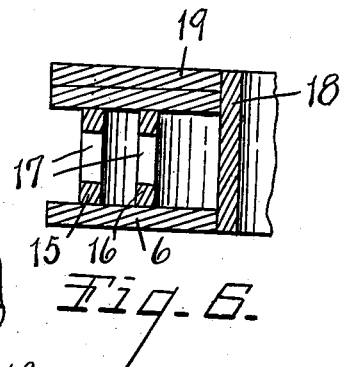
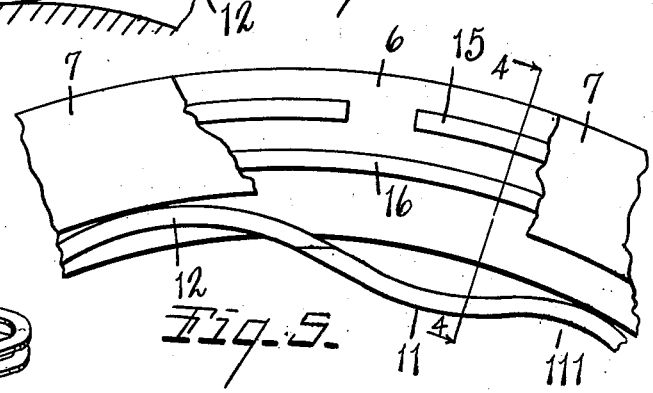
INVENTOR.
HAROLD P. PHILLIPS
BY Earl & Chappell
ATTORNEYS Patented Apr. 27, 1943

2,317,637

UNITED STATES PATENT OFFICE 2,317,637

PISTON RING

Harold P. Phillips, Hastings, Mich., assignor to Hastings Manufacturing Company, Hastings, Mich., a corporation of Michigan Application March 11, 1940, Serial No. 323,273

12 Claims. (Cl. 309—45)

This invention relates to improvements in piston rings.

The main objects of my invention are:

First, to provide a novel composite piston ring assembly, particularly adapted for use as an oil ring, which is highly efficient in operation.

Second, to provide a piston ring of the type described particularly adapted for installation in an oil ring groove, which is very effective in the oil control, having more drainage, more universal action, and more effective scraping edges to remove oil than hitherto known piston ring designs.

Third, to provide a composite ring of the type described including a plurality of cylinder wall engaging segments and means for insuring an independent radial thrust thereof against a cylinder wall.

Further objects relating to details and economies of my invention will appear from the description to follow. The invention is defined in the claims.

A structure embodying the features of my invention is illustrated in the accompanying drawing, wherein:

Fig. 1 is an enlarged fragmentary view in vertical section illustrating the assembly of my invention installed in an oil ring groove of a piston in operative relation to a cylinder wall.

Fig. 2 is a fragmentary view in vertical section further illustrating the construction and relation of certain of the parts of the assembly of Fig. 1.

Fig. 3 is a fragmentary plan view partially broken away and in section on line 3—3 of Fig. 1, illustrating the details of construction, the expander spring being shown in full lines.

Fig. 4 is a fragmentary view in section on line 4—4 of Fig. 5, illustrating a modified embodiment of my invention.

Fig. 5 is a fragmentary plan view partially broken away and in section on line 5—5 of Fig. 4, further illustrating the details of construction and arrangement of the parts in the embodiment of Fig. 4.

Fig. 6 is a view generally similar to Fig. 4, illustrating a still further modified embodiment of the assembly of my invention.

Fig. 7 is a fragmentary view of one of the upper cylinder wall engaging elements or members of Fig. 6.

The present invention relates to improvements in the piston ring assembly illustrated in my copending application Serial No. 237,687, filed October 29, 1938, being concerned particularly with a piston ring assembly which is well adapted for use in an oil ring groove of the piston of an internal combustion engine. This assembly is highly efficient as an oil ring due to the fact that it embodies a number of oil scraping segments and has ample drainage. In the present embodiment, there is preferably employed in connection with a generally similar assembly an inner expanding spring of the type illustrated in the copending application of Aben E. Johnson, Serial No. 320,003, filed February 21, 1940, which furthers the independence of action of the various cylinder wall engaging segments of the assembly, and still further enhances the effectiveness of the oil control exerted thereby.

Referring to the drawing, the reference numeral 1 indicates a cylinder having a piston 2 reciprocable therein. Only the oil ring groove 3 is illustrated, communicating through a drainage passage 4 with the interior of the piston. The ring assembly of my invention is generally designated by the reference numeral 5.

This assembly consists of a pair of upper and lower expansible cylinder wall engaging segments 6 of thin annular split ribbon-like, preferably relatively hard material, for example, steel. These segments are disposed in axially spaced relation in sliding engagement respectively with the top and bottom walls of the ring groove and are maintained in said spaced relation by a plurality of instrumentalities including the intermediate thin split expansible cylinder wall engaging segment 7 which preferably is also of thin hard material, such as ribbon steel, and a spacer unit 8.

This spacer unit consists of a split annular ring 9 having a plurality of circumferentially spaced rivet-like supports or pillars 10 secured thereto and extending equal distances on opposite sides thereof for engagement with the intermediate ring 7 and the lowermost segment 6, respectively. The last named ring and segment are thus maintained in proper axially spaced relation with the spacer unit ring 9 midway between the same. The aforesaid spacer unit ring 9 is, like the segments 6 and the intermediate ring 7, adapted for engagement with the cylinder wall and constitutes an additional oil control element.

In order to urge the aforesaid segments and rings outwardly for effective radial thrust engagement with the cylinder wall, I utilize an expanding spring which is generally of the type illustrated in the Johnson application Serial No. 320,003 referred to above, in that it consists of a thin annular split strip 11 of spring metal having a plurality of crimps 111 therein. The axial width of this strip is approximately equal to the axial dimension of the groove so as to adapt certain of the crimps for radial thrust engagement with the rear edges of segments 6, but alternate crimps, which are designated by the reference numeral 12, are cut away at their edges to reduce the axial width thereof and permit the same to project outwardly between the steel segments 6 for radial thrust engagement with the rear edges of the intermediate ring 7 and spacer unit ring 9. If desired, the axial width of the reduced crimps may be approximately equal to the space between segments 6, so that the aforesaid projecting crimps may serve as supplemental spacing means for the steel segments, however this is not necessary in all cases, for the intermediate ring 7 and spacer unit are generally sufficient for this purpose. The projecting crimps 12 do, however, have radial thrust engagement with rings 7, 8 to assure their desired outward expansion into engagement with the cylinder wall.

In the copending application of Johnson Serial No. 320,004, filed Feb. 21, 1940, there is illustrated still another type of inner expanding spring which is well adapted for use in the present assembly in lieu of the expander spring 11 shown and of course it will be appreciated that if desired separate expanding springs in concentric relation to one another might be employed if desired, one thereof in radial thrust engagement with segments 6 and the other in corresponding engagement with the rings 7, 9.

I have found the assemblies of my present invention to be highly efficient as oil rings. It is known that there is a certain amount of oil in the oil ring groove at all times. Likewise, when the piston reverses its direction of travel at the top of its stroke, it tends to rock slightly, at which time the oil ring, if a unitary one, tends to separate from the cylinder wall at one side. This separation occurs at just the instant when the oil in the groove under the influence of pressure and the impetus of its upward movement is apt to escape upwardly past the assembly, however in the composite construction of my invention, including separate upper and intermediate segments or rings 6, 7, it is assured that such a gap or parting between the ring and cylinder wall will not occur. These rings maintain their engagement with the cylinder wall, so that the oil in the groove between segments 7 and 6 will be maintained therein. This is made possible by the independence of the cylinder wall engagement effected by the various segments and rings, which in turn is materially contributed to by the particular design of inner expanding spring which I preferably utilize.

In the present construction, there is ample oil drainage space and a relatively large number of cylinder engaging elements in addition to its improved universality of action. These are important factors in the production of an effective oil control assembly.

In Figs. 4 and 5, I illustrate a somewhat modified embodiment of my invention, wherein the spacer unit 8 of Figs. 1 and 2 is replaced by a pair of annular split sections 15, 16 in concentric relation to one another. These sections may have any suitable provision for centering the same with one another and maintaining their radial spacing or, if desired, they may be mounted loosely in the space between ring 7 and segment 6. They are apertured or vented at 17 to provide the ample drainage opening necessary in a ring of the type under consideration. The expanding spring employed therewith is similar to that of Figs. 1 and 2 and is accordingly designated by the same reference numeral.

In Fig. 6, I illustrate another embodiment wherein the side member 19 is formed of a double coil or ribbon steel, the spacer members 16 and 17 being arranged as in Fig. 4. In this embodiment, the expander 18 is of the crimped type of inner spring and is in thrust or expanding relation to the element or member 19 and the member 6.

As stated in the foregoing description, all of the wall engaging members or elements are possessed of certain inherent or initial expanding action when compressed for insertion in a cylinder, the thrust imparted thereto by the expanders being in addition to this inherent expanding tension.

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A piston ring assembly, comprising a pair of thin, flat, annular, split cylinder wall engaging side members of wear resisting material, an intermediate thin flat split annular cylinder wall engaging element disposed in side by side relation to the upper of said side members, a spacer disposed between said intermediate member and the lower side member, said spacer comprising a thin, annular, split cylinder wall engaging member having a plurality of circumferentially spaced rivet-like members disposed therethrough to coact with said intermediate member and the lower side member, and an annular spring expander having a plurality of crimps therein, certain of which are in coacting thrust relation to said side members and others of which are of reduced axial width to extend between said side members and coact with the said intermediate member and said spacer member and to constitute supplementary spacing members for said side members.

2. A piston ring assembly comprising a pair of thin flat annular split cylinder wall engaging side members of wear resisting material, an intermediate thin flat split annular cylinder wall engaging element disposed in side by side relation to the upper of said side members, a spacer disposed between said intermediate member and the lower side member, said spacer comprising a thin annular split cylinder wall engaging member having a plurality of circumferentially spaced rivet-like members disposed therethrough to coact with said intermediate member and the lower side member, and an annular spring expander having a plurality of crimps therein, certain of which are in coacting thrust relation to said side members and others of which are of reduced axial width to extend between said side members and coact with the said intermediate member and said spacer member.

3. A piston ring assembly comprising a pair of thin flat annular split cylinder wall engaging side members of wear resisting material, an intermediate thin flat split annular cylinder wall engaging element disposed in side by side relation to one of said side members, a spacer disposed between said intermediate member and the other side member, said spacer comprising a thin annular split cylinder wall engaging member having a plurality of circumferentially spaced lugs to coact with said intermediate member and the side member remote therefrom, and an annular expander having a plurality of crimps therein, certain of which are in coacting thrust relation to said side members and other of which are of reduced axial width to extend between said side members and coact with the said intermediate member and said spacer member and to constitute supplementary spacing members for said side members.

4. A piston ring assembly comprising a pair of expansible cylinder wall engaging members of wear resisting material, an intermediate expansible cylinder wall engaging element disposed in side by side relation to one of said side members, a spacer disposed between said intermediate member and the other side member, and an annular expander having a plurality of crimps therein, certain of which are in coacting thrust relation to said side members and others of which are spaced circumferentially from said certain crimp and of reduced axial width to extend between said side members and engage said intermediate member to urge the same outwardly.

5. A piston ring assembly comprising expansible annular cylinder wall engaging side members of ribbon steel and an intermediate expansible annular cylinder wall engaging member of ribbon steel, a spacer disposed between said intermediate and one of said side members, and means for exerting independent radial expanding thrust to said side and intermediate members, comprising an annular split strip of spring material having portions in radial thrust coaction with at least one of said side members and other portions spaced circumferentially from said portions and extending between said side members in coacting thrust relation to said intermediate member.

6. A composite piston ring assembly comprising a pair of cylinder wall engaging side members of ribbon steel, an intermediate thin split cylinder wall engaging element of ribbon steel disposed in side by side relation with one of said pair of side members, means for axially spacing said intermediate element and the other side members comprising a pair of annular split spacer members disposed in concentric relation to each other for coaction with said intermediate element and the side member remote therefrom, said spacer members having oil drainage openings therein, and an expander having portions thereof coacting with said side members and other portions coacting with said intermediate member for independently urging the same radially outward, said expander likewise having oil drainage openings therein.

7. A composite piston ring assembly comprising a pair of expansible cylinder wall engaging side members of ribbon steel, an intermediate expansible cylinder wall engaging element of ribbon steel disposed in side by side relation with one of said pair of side members, means for axially spacing said intermediate element and the other side member comprising a pair of annular split spacer members disposed in concentric relation to each other for coaction with said intermediate element and the side member remote therefrom, said spacer members having oil drainage openings therein, and means for independently urging said members and said intermediate element outwardly.

8. In a composite piston ring assembly particularly adapted for installation in the oil groove of a piston, a pair of axially spaced expansible cylinder wall engaging members, a further expansible cylinder wall engaging element between said pair of members in sliding contact with the uppermost member, and ventilated means for maintaining said uppermost member and element in axially spaced relation to the lowermost member, and expander means for urging said members and element outwardly, comprising an expander ring having portions of full axial width engageable with said members to urge the same radially and further portions of reduced axial width extending between and in axial supporting engagement with said members, said further portions engaging said element and urging the same radially.

9. In a composite piston ring assembly particularly adapted for installation in the oil groove of a piston, a pair of axially spaced expansible cylinder wall engaging members, a further expansible cylinder wall engaging element between the members in sliding contact with one thereof, means for maintaining said members and element in axially spaced relation to the other member, and expander means for said members and element, comprising an expander ring having portions engageable with said members to urge the same radially and further portions spaced circumferentially from said portions and engaging said element to urge the same radially.

10. In a composite piston ring assembly, an expansible cylinder wall engaging member, a further expansible cylinder wall engaging element of less radial width disposed adjacent said member, ventilated means for maintaining said member and element in axially spaced relation, an expander means for urging said member and element outwardly, comprising an expander ring having relatively wide crimp portions expansively engageable with said member and further crimp portions of reduced axial width circumferentially spaced from said first named portions and radially overlapping said member to expansively engage said element, said further portions having axial supporting engagement with said member in the zones of overlap therewith.

11. In a composite piston ring assembly, an expansible cylinder wall engaging member, a further expansible cylinder wall engaging member of different radial width disposed adjacent said member and an expander means for urging said members outwardly, comprising an expander ring having relatively wide crimp portions expansively engageable with the wider of said members and further crimp portions of reduced axial width circumferentially spaced from said first named portions and radially overlapping the wider member to expansively engage the other member, said further portions having axial supporting engagement with said wider member in the zones of overlap therewith.

12. In a composite piston ring assembly, an expansible cylinder wall engaging member, a further expansible cylinder wall engaging member of different radial width disposed adjacent said member, and an expander means for urging said members outwardly, comprising an expander ring having crimp portions expansively engageable with the wider of said members and further crimp portions circumferentially spaced from said first named portions and radially overlapping the wider member to expansively engage the other member.

HAROLD P. PHILLIPS.